United States Patent [19]

Drake

[11] 3,711,053

[45] Jan. 16, 1973

[54] TELESCOPING WALL MOUNTING BRACKET FOR ELECTRICAL RACKS

[75] Inventor: King B. Drake, Los Angeles, Calif.

[73] Assignee: Dracon Industries, Chatsworth, Calif.

[22] Filed: Nov. 18, 1970

[21] Appl. No.: 90,838

Related U.S. Application Data

[63] Continuation of Ser. No. 814,723, April 9, 1969, abandoned, which is a continuation of Ser. No. 634,313, April 27, 1967, Pat. No. 3,468,429.

[52] U.S. Cl. .................248/298, 179/91, 211/87
[51] Int. Cl. ...................................H47f 7/00
[58] Field of Search .........248/201, 298; 287/58 CT; 317/99, 120; 179/91 R; 211/87, 169, 13, 88, 94, 162

[56] References Cited

UNITED STATES PATENTS

| | | | |
|---|---|---|---|
| 3,468,429 | 9/1969 | Drake | 317/99 X |
| 1,459,602 | 6/1923 | Relerson | 211/88 |
| 3,235,296 | 2/1966 | Day | 287/58 CT |
| 2,885,502 | 5/1959 | Eichelberger | 317/103 X |
| 1,050,235 | 1/1913 | Scanlan | 248/298 X |
| 2,858,180 | 10/1958 | Tashjian et al. | 312/7 R X |
| 2,486,764 | 11/1949 | Singer | 312/7 R UX |
| 2,949,506 | 8/1960 | Abbott et al. | 179/91 R X |
| 1,863,376 | 6/1932 | Kessler et al. | 179/91 R |
| 2,769,940 | 11/1956 | Rettit | 317/120 |

Primary Examiner—J. Franklin Foss
Attorney—Allan M. Shapiro

[57] ABSTRACT

The telescoping wall mounting bracket comprises a foot adapted to be wall-secured, to which is permanently fixed the smaller of two telescoping members. The larger telescoping member surrounds the smaller, and telescopic extension is limited by cables attached between the members. The larger member is securable into an electrical rack structure, or into supporting means therefor so that the rack structure can be moved away from or toward the wall upon which it is mounted for access to the rear thereof or general adjustment of the spatial separation of the structure relative to the wall.

6 Claims, 8 Drawing Figures

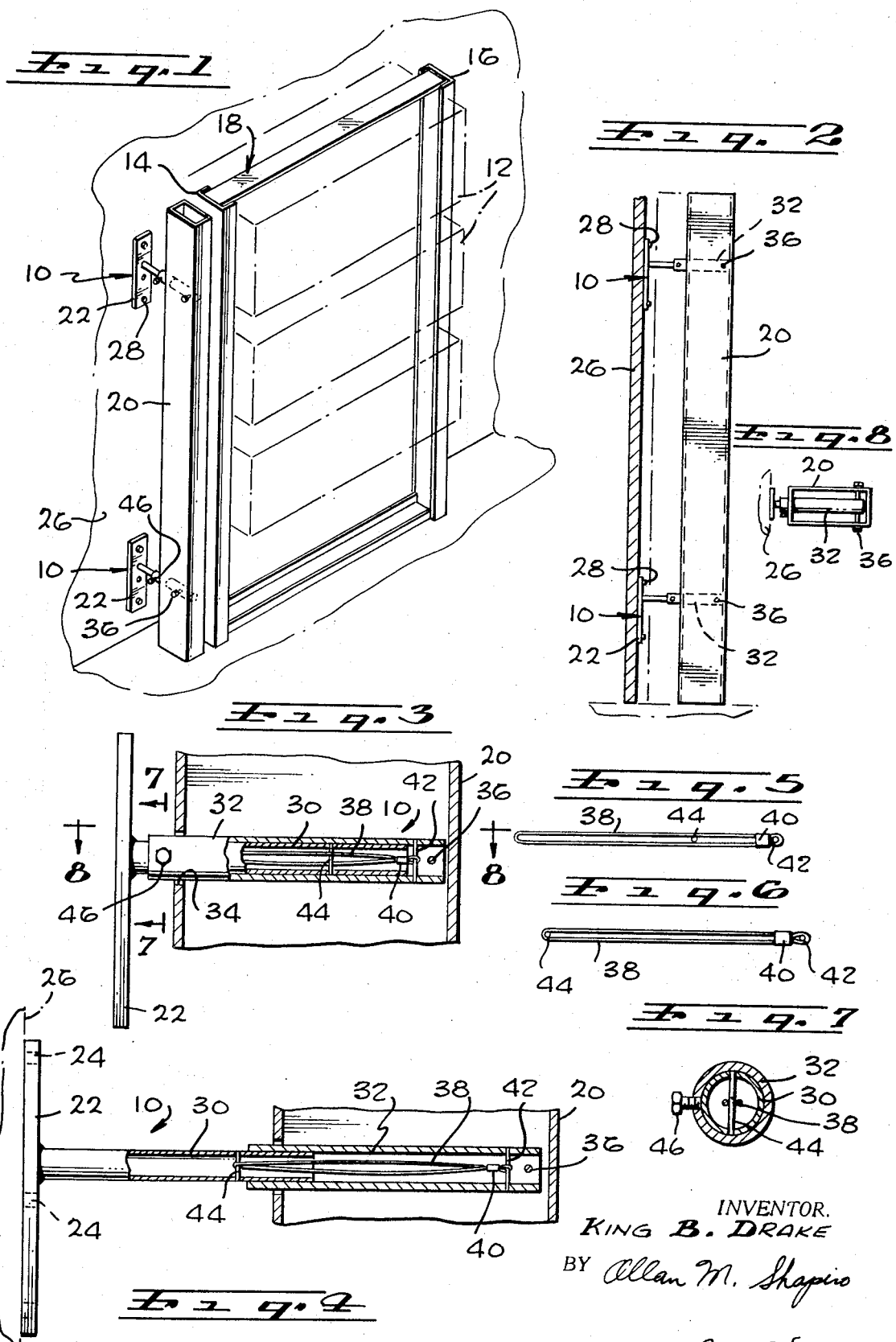

TELESCOPING WALL MOUNTING BRACKET FOR ELECTRICAL RACKS

CROSS-REFERENCES

This application is a continuation of copending application Ser. No. 814,723, filed Apr. 9, 1969, now abandoned, which was a continuation-in-part of copending application Ser. No. 634,313, filed Apr. 27, 1967, now U.S. Pat. No. 3,468,429, issued Sept. 23, 1969.

BACKGROUND OF THE INVENTION

1. Field of the Invention

This invention is directed to a telescoping wall mounting bracket for electrical racks, and particularly for racks which are adapted to carry structure which requires access to both the front and back thereof.

2. Description of the Prior Art

Electrical racks are well known convenient structures for the mounting and the interconnection of electronic components. Electronic racks are widely used in all types of electrical equipment wherein the equipment is expensive or complex. For example, computers are virtually entirely made up of rack-mounted components. Another field of rack-mounted, electrical equipment is that of telephone circuitry. Central office equipment is entirely rack-mounted, and much rack mounting is employed in office buildings and other locations where there is a considerable amount of telephone equipment. For example, modern office buildings have a telephone equipment room on each floor. Despite the fact that space is set aside for such equipment, it is clear that the equipment must occupy little space, for floor space in such buildings is valuable. For this reasons, as well as the convenience of harness wiring equipment, telephone companies have employed rack mounting of equipment for many years. However, it is necessary that access be provided to both sides of rack-mounted equipment. Such access to both sides is particularly difficult in those cases where floor space limitations suggest mounting the rack directly upon the wall or to the floor, and the latter method is not alwyas available or convenient. Accordingly, prior wall-mounting structures have provided means which are cumbersome and unsatisfactory for reaching both sides of the equipment due to the fixed mounting of the rack to either the wall or floor or both.

SUMMARY OF THE INVENTION

In order to aid in the understanding of this invention, it can be stated in essentially summary form that it is directed to a telescoping wall-mounting bracket for electrical racks. The bracket comprises inner and outer telescoping members, with the inner member being adapted to be secured to the wall. The outer member is adapted to be secured to rack mounting structure so that the rack mounting structure accommodates this portion of the telescoping device and acts as a guide for the wall-mounted portion. Stop means engages the two telescoping portions to prevent their total separation, and thus prevents the rack from becoming uncontrolled by bracket separation.

Accordingly, it is an object of this invention to provide a telescoping wall-mounting bracket for electrical racks. It is another object to provide a bracket having telescoping halves, one of which is adapted to be secured to a wall, and the other half of which is adapted to be secured to a supported rack. It is still another object to provide inter-engaging stop means between the portions of the telescoping structure so that total separation is prevented. It is still another object to provide wall-mounting means for the inner half of the telescoping bracket, and rack-mounting means on the outer half of the telescoping bracket so that the outer half serves as a guide which slides over the inner, wall-mounted half. It is still another object of this invention to provide a bracket which permits the electrical rack mounted thereon to be selectively positioned with respect to the wall, so that racks having different depths of electrical equipment can be accommodated.

Still other objects, features and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts in the several figures.

BRIEF DESCRIPTION OF THE DRAWINGS

FIG. 1 is a perspective view showing two of the telescoping, wall-mounting brackets for electrical racks as installed and carrying rack-mounting structure thereon.

FIG. 2 is a side elevational view thereof.

FIG. 3 is an enlarged section, with parts broken away, showing further detail of the telescoping wall-mounting bracket of this invention, in the closed position.

FIG. 4 is a view similar to FIG. 3, showing the bracket in the extended position.

FIG. 5 is a detailed view of the stop structure, showing the stop structure with the telescoping members in the closed position.

FIG. 6 is a view similar to FIG. 5 showing the stop structure with the telescoping members in their fully extended position.

FIG. 7 is a section taken generally along line 7—7 of FIG. 3.

FIG. 8 is a section on reduced scale taken generally along line 8—8 of FIG. 3.

DESCRIPTION OF THE PREFERRED EMBODIMENT

The telescoping wall-mounting bracket for electrical racks is generally indicated in the drawings at 10. FIG. 1 illustrates electrical equipment 12 in broken lines, mounted upon racks which are secured in a frame 18. Frame members defining the edges of the frame are indicated at 14 and 16. The frame members 14 and 16 are connected top and bottom to form a rigid frame 18. The electrical equipment is suitably mounted on the frame, which may include a center board to which equipment and connectors are attached both front and back, or may comprise equipment which is positioned between the frame members to extend both front and back of the frame.

In telephone service, quite often a center board is used, or a double center board which has a wireway therebetween. Relays are secured in banks to one side of this center structure while terminal boards are secured to the other. In this manner, the equipment and its connections are closely associated with each other and furthermore are sufficiently close to provide for convenient interconnecting wiring. If desired, such units can be factory pre-assembled. However, it is clear that such units require access to both sides for maintenance of the relays and for access to the terminal boards for cable connection.

In the embodiment illustrated, partial access to both sides is provided by hinging frame 18. Post 20 is a rectangular tube to which frame member 14 is hingeably secured. The hinge arrangement permits the right-hand side of frame 18, away from the hinges, to swing away from the wall. Such may provide for clear access to the equipment toward frame member 16 but not to the equipment adjacent frame member 14 since the latter stays fairly close to the wall. Furthermore, such a structure does not provide for variability of the distance between frame member 18 and the wall which distance should depend upon the depth of the equipment on the rear of frame 18. Still further, one or more banks of comparable equipment racks may be located in front of frame 18 so as to prevent any hinged access at all.

Telescoping wall mounting bracket 10 is provided to obtain and is appropriately mounted for additional flexibility of mounting of frame 18. Bracket 10 comprises base plate 22 which has holes therein for securement of base plate 22 against wall 26 by any appropriate fastening means 28, such as lagscrews. Of course, the type of fastening device depends entirely upon the character of wall 26. An appropriate securing means is used in accordance with the nature of the wall material.

Post 30, as seen particularly in FIGS. 3 and 4, is the inner telescoping member, and is secured to base plate 22. As is seen in FIG. 4, post 30 is preferably tubular, to provide the maximum rigidity for a particular weight. Post 30 is of an appropriate length to provide the desired amount of telescopic extension of the bracket 10 consistent with enough overlap in the fully extended position to provide the proper strength. Tube 32 is the outer member of the telescoping pair. Tube 32 has a bore of such configuration and size as to fit over, in telescopic sliding relationship, the base plate mounted post 30. Thus, telescopic extensibility is achieved. Tube 32 is preferably of such length as to be slightly longer than the depth of frame post 20. Thus, it can lie substantially entirely within frame post 20 and extend from adjacent the front wall of the tube of frame post 20 through an appropriate opening 34 in the rear wall thereof.

Securement of tube 32 in frame post 20 is accomplished by cross bolt 36 which extends through frame post 20 and through appropriate transverse holes in the end of telescoping tube 32 which is away from base plate 22. The positioning of telescoping tube 32 in opening 34 provides a certain amount of flexibility so that self-alignment can be achieved. It is seen that, since tube 32 is mounted upon and in frame post 20, telescoping tube 32 serves as a guide into frame post 20. The inversion of this structure would not be as satisfactory with a larger tube mounted upon base plate 22 and the smaller mounted in frame post 20. Mounting problems appear which are obviated by the illustrated and preferred construction.

A stop is required to prevent tube 32 from falling completely off telescopic post 30 with consequent loss of control or management of frame 18 and its equipment. Stopping or limiting of telescoping is accomplished by means of stop cable 38. Stop cable 38 is preferably a fairly flexible, strong cable, such as a steel cable. It is looped to an appropriate length and carries end securement clamp 40 adjacent one end. As is seen in FIGS. 3-6, clamp 40 forms stop cable 38 into a small loop and a large loop.

Pin 42 passes through telescoping tube 32 adjacent its securing cross bolt 36 and passes through the small loop of stop cable 38. Similarly, pin 44 is engaged in the walls of telescoping post 30 and passes through the large loop in stop cable 38. Both pins 42 and 44 are secured in their respective tubes to provide rigid stop means against which the stop cable 38 can act.

Telescoping post 30 and tube 32, cable 38 and the positions of pins 42 and 44 are dimensioned so that, when the telescoping bracket is compressed into the position shown in FIG. 3, the pins and cables do not interfere with full telescoping. Additionally, there is a dimension such that, when telescoping tube 32 is pulled out to the maximum desired distance on post 30, stop cable 38 draws taut on pins 42 and 44 to prevent further motion. It should be noted that the large loop of the stop cable is sufficiently short so that no cable bending is necessary to permit telescoping retraction. Thus, the loop simply slides over pin 44 and the tube and post are telescoped with respect to each other.

Lock bolt 46 is threadedly engaged in tube 32 and is positioned to engage and lock against post 30 when it is tightened. Lock bolt 46 thus provides means to lock the telescoping tubes of the bracket of this invention with respect to each other so that full securement is achieved in any desired position.

When a serviceman approaches electrical equipment 12, he can hinge the electrical equipment away from wall 26 by simple hinging between frame member 14 and frame post 20. However, in order to obtain maximum working space, the serviceman normally unlocks lock bolt 46 and pulls frame post 20 forward, away from the wall, to the maximum extension of stop cables 38. If desired, he thereupon locks lock bolt 46 to prevent telescoping action during service operations. Thereupon, the serviceman can swing frame 18 outwardly to provide a maximum of space to the front and rear thereof.

After service is complete, the serviceman swings frame 18 back, parallel to the wall. He unlocks lock bolt 46, if they are tightened, and he presses the entire frame 18 back toward the wall. In those cases where new equipment was added to the back side of the equipment section, the frame may remain a farther distance from the wall to provide adequate clearance therefor. In any event, the frame is moved backward toward the wall to an appropriate distance in accordance with the equipment mounted thereon, the required ventilation and other equipment considerations. Any desired spacing can be obtained, consistent with the equipment needs by the utilization of the telescoping wall mounting bracket of this invention. Thus, the equipment can be properly positioned. Differences in equipment depth and/or rack location are illustrated in broken lines in FIG. 2. After positioning of the equipment at the proper distance from the wall, lock bolts 46 are tightened to again lock the structure in the desired position until further servicing becomes necessary.

In view of the telescopic feature of the wall mounting bracket of this invention, it is not necessary to employ a hinge structure with the telescoping bracket. Instead, the telescoping wall-mounting bracket is equally applicable when it is directly applied to frame member 14. In such a case, the entire frame 18 moves outwardly from the wall on the telescoping brackets. Such is satisfactory when the telescoping wall mounting brackets provide a sufficient telescoping length to provide adequate access to the rear of the panel. As described above, appropriate design provides the desired telescoping distance. Thus, the brackets can be employed with or without associated hinging of the electrical rack frame.

It is important to note that the bracket foot or base plate 22 need not be vertically oriented, as illustrated, but may be rotated with its post 30 as much as 90° in either direction about the longitudinal axis of the post and within the tube 32 so as to be located in any desired orientation, thus permitting attachment to structural members which may be within the wall in non-aligned positions, avoidance of obstructions on the wall, and so forth. Such relative rotation is easily permitted by the flexibility of cable 38 and does not interfere with the longitudinal movement of cable 38 relative to pin 44.

This invention having been described in its preferred embodiment, it is clear that it is susceptible to numerous modifications and embodiments within the ability of those skilled in the art and without the exercise of the inventive faculty.

What is claimed is:

1. Telescoping, wall-mounting bracket means for mounting a frame for the support of electrical racks, which frame has an upright frame member, said frame being hingedly mounted to an upright post, said bracket means being for mounting said upright post with respect to a wall, said bracket means comprising upper and lower brackets mounted on said post and securable to a wall, the improvement wherein each said bracket comprises:

a first telescoping member;

a second telescoping member, said second telescoping member inter-engaging with said first telescoping member so that the overall length of said first and second telescoping members is selectable;

stop means inter-engaged between said telescoping members, said stop means limiting the relative motion of said first and second telescoping members to a predetermined minimum overall length;

wall-mounting means on one of said telescoping members, said wall-mounting means adapting said telescoping member to wall mounting thereof; and mounting means on the other telescoping member, said mounting means being connected to said post so that the rack hingedly mounted on said post can be supported with respect to a wall in telescoping arrangement with respect thereto whereby the distance from the rack to the wall can be selected.

2. The telescoping, wall-mounting bracket of claim 1 wherein said telescoping member carrying a wall mounting means thereon comprises an inner member, and said telescoping means carrying mounting means thereon comprises an outer tube in engagement with and telescopically sliding over said inner member, said outer tube being adapted to be positioned in and secured to the frame of an electrical rack.

3. The telescoping, wall-mounting bracket of claim 2 wherein said inner member is tubular and a pin extends across said inner tubular member, a pin extends across said outer tube, and limit means engaging around both of said pins, said limit means limiting the maximum telescoping dimension between said tubes.

4. The telescoping, wall-mounting bracket of claim 3 wherein said limiting means comprises a looped metallic cable extending around both of said pins so that said cable becomes taut when said outer tube is telescoped to maximum dimension away from said mounting means on said inner tubular member.

5. The telescoping, wall-mounting bracket of claim 4 wherein a lock bolt is engaged between said telescoping tubes so that said tubes can be locked with respect to each other to prevent telescoping motion.

6. The telescoping, wall-mounting bracket of claim 2 wherein said upright post to which said upper and lower brackets are attached is in the form of an upright hollow post, an opening in the wall of said post, said outer telescoping member extending through said opening and into said post and being secured within said post, said opening being larger than said outer telescoping member so as to permit angular flexiblity of said outer telescoping member with respect to said hollow upright post.

* * * * *